US012694610B2

(12) United States Patent (10) Patent No.: US 12,694,610 B2
Prasad et al. (45) Date of Patent: Jul. 28, 2026

(54) STRUCTURE-FROM-MOTION (SFM) SEQUENCING USING NON-VISUAL INFORMATION

(71) Applicant: QUALCOMM Incorporated, San Diego, CA (US)

(72) Inventors: Abhishek Prasad, Cambridge (GB); Thomas Allan, St Neots (GB); Murray Jarvis, Cambridge (GB); Nicolas Graube, Cambridge (GB); Ramji Srinivasan, Cambridge (GB); Benjamin Tarlow, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 18/390,575

(22) Filed: Dec. 20, 2023

(65) Prior Publication Data

US 2025/0209736 A1 Jun. 26, 2025

(51) Int. Cl.
G06T 17/00 (2006.01)
G06V 10/74 (2022.01)

(52) U.S. Cl.
CPC ............ G06T 17/00 (2013.01); G06V 10/761 (2022.01)

(58) Field of Classification Search
CPC ..................... G06T 7/579; G06T 17/00; G06T 2207/10016; G06V 10/761
USPC ........................................................ 345/418
See application file for complete search history.

(56) References Cited

U.S. PATENT DOCUMENTS

| | | | | |
|---|---|---|---|---|
| 12,353,223 | B2 * | 7/2025 | Cristache | G06F 40/30 |
| 2017/0169583 | A1 | 6/2017 | Ishihara et al. | |
| 2021/0034679 | A1 * | 2/2021 | Cristache | G06V 20/10 |
| 2023/0071446 | A1 * | 3/2023 | Narayana | G06F 16/5866 |
| 2023/0410349 | A1 * | 12/2023 | Arnold | G06T 5/70 |
| 2023/0418287 | A1 * | 12/2023 | Cristache | G07C 9/00174 |
| 2024/0289901 | A1 * | 8/2024 | Aphek | G06T 7/80 |
| 2025/0190640 | A1 * | 6/2025 | Narayana | G06F 30/13 |

OTHER PUBLICATIONS

Zhu Y, Liu S, Newsam S. Large-scale mapping of human activity using geo-tagged videos. InProceedings of the 25th ACM SIGSPATIAL international conference on advances in geographic information systems Nov. 7, 2017 (pp. 1-4).*

(Continued)

*Primary Examiner* — Phu K Nguyen
(74) *Attorney, Agent, or Firm* — Polsinelli

(57) ABSTRACT

Disclosed are techniques for image processing. For example, a computing device can obtain a first video of a scene (including a plurality of first image frames), first non-visual data along a first route, a second video of the scene (including a plurality of second image frames), and second non-visual data along a second route. The computing device can compare the first non-visual data with the second non-visual data and determine first image frame(s) that are similar to second image frame(s). The computing device can determine pairs of image frames from the first image frame(s) and the second image frame(s) based on image data of the scene in the first and second image frame(s). The computing device can process the pairs of image frames to reconstruct the scene with a reconstruction of an overlap of the first route and the second route.

20 Claims, 13 Drawing Sheets

600

(56) References Cited

OTHER PUBLICATIONS

Wang G, Lu Y, Zhang L, Alfarrarjeh A, Zimmermann R, Kim SH, Shahabi C. Active key frame selection for 3d model reconstruction from crowdsourced geo-tagged videos. In2014 IEEE International Conference on Multimedia and Expo (ICME) Jul. 14, 2014 (pp. 1-6 ). IEEE.*

Zhang J, Wang S, Huang Q. Location-based parallel tag completion for geo-tagged social image retrieval. ACM Transactions on Intelligent Systems and Technology (TIST). Apr. 20, 2017;8(3):1-21.*

Ma H, Zimmermann R, Kim SH. HUGVid: handling, indexing and querying of uncertain geo-tagged videos. InProceedings of the 20th International Conference on Advances in Geographic Information Systems Nov. 6, 2012 (pp. 319-328).*

International Search Report and Written Opinion—PCT/US2024/057342—ISA/EPO—Mar. 6, 2025.

Zhang L., et al., "An Automatic Three-Dimensional Scene Reconstruction System Using Crowdsourced Geo-Tagged Videos", IEEE Transactions on Industrial Electronics, IEEE Service Center, Piscataway, NJ, USA, vol. 62, No. 9, Sep. 1, 2015, pp. 5738-5746, XP011665518, Sections III, IV, V, Figures 1-3.

* cited by examiner

100
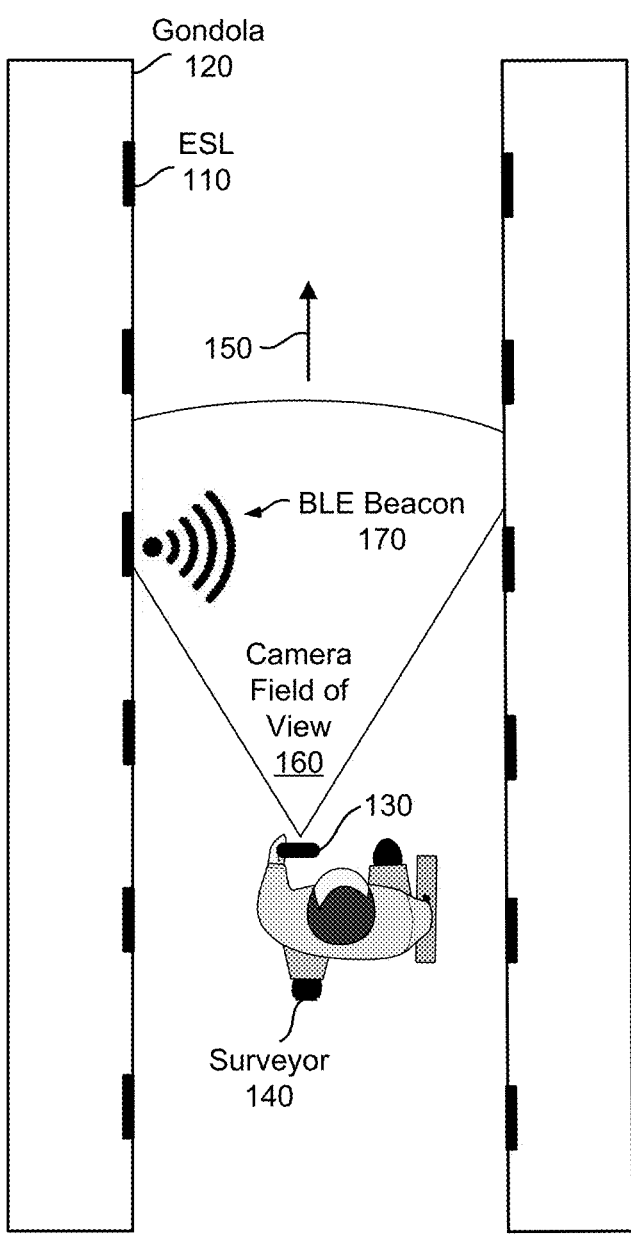
Gondola
120
ESL
110
150
BLE Beacon
170
Camera
Field of
View
160
130
Surveyor
140
FIG. 1

1100

$Y_1$

Route 1
1110a

1120a $X_1$ $IN_{r1}$ $fp_{1N}$ $I8_{r1}$ $I7_{r1}$   $fp_{17}$ $I6_{r1}$   $fp_{16}$ $I5_{r1}$   $fp_{15}$ $I4_{r1}$   $fp_{14}$ $I3_{r1}$   $fp_{13}$ $I2_{r1}$   $fp_{12}$ $I1_{r1}$   $fp_{11}$

1130a $I1_{r2}$   $fp_{21}$ $I2_{r2}$   $fp_{22}$ $T4$

1130b

1130c $fp_{2M}$ $Y_2$ $X_2$ $I7_{r2}$ $I8_{r2}$ $fp_{28}$   $fp_{27}$

1110b $IM_r$

1120b

Springs between
common observations
pull the tracks into
shape

1110b
Route 2

S

1200

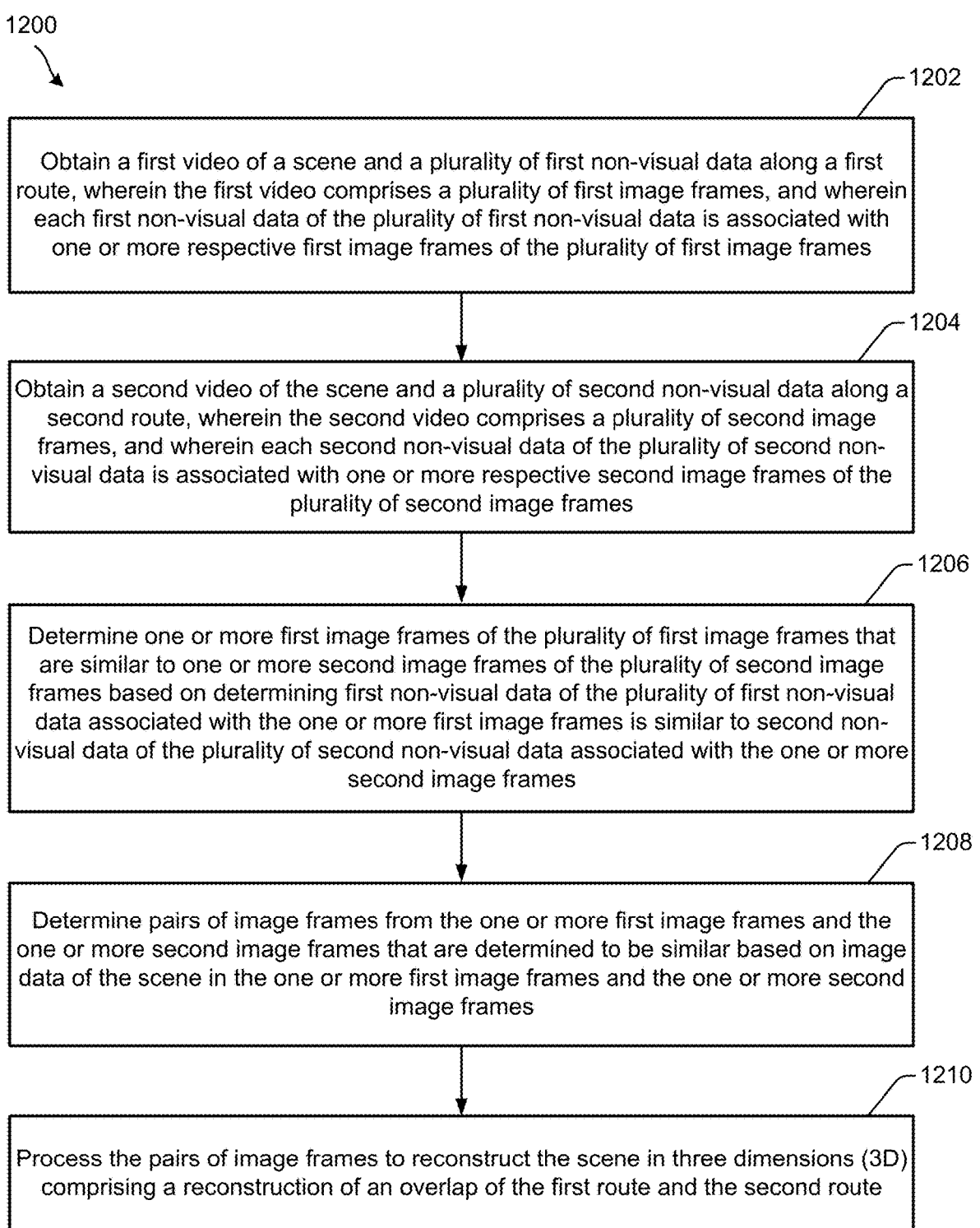

1202

Obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames

1204

Obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames

1206

Determine one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames

1208

Determine pairs of image frames from the one or more first image frames and the one or more second image frames that are determined to be similar based on image data of the scene in the one or more first image frames and the one or more second image frames

1210

Process the pairs of image frames to reconstruct the scene in three dimensions (3D) comprising a reconstruction of an overlap of the first route and the second route

FIG. 12

STRUCTURE-FROM-MOTION (SFM) SEQUENCING USING NON-VISUAL INFORMATION

FIELD

The present disclosure generally relates to image processing. For example, aspects of the present disclosure relate to structure-from-motion (SFM) sequencing using non-visual information, such as for three dimensional (3D) reconstruction of a scene.

BACKGROUND

The increasing versatility of digital camera products has allowed digital cameras to be integrated into a wide array of devices and has expanded their use to different applications. For example, phones, drones, robots, cars, computers, televisions, and many other devices today are often equipped with camera devices. The camera devices allow users to capture images and/or video (e.g., including frames of images) from any system equipped with a camera device. The images and/or videos can be captured for inventory management, automation, surveillance, professional photography, and recreational use, among other applications. Moreover, camera devices are increasingly equipped with specific functionalities for modifying images or creating artistic effects on the images. For example, many camera devices are equipped with image processing capabilities for generating different effects on captured images.

There has recently been a demand for 3D content for computer graphics, commercial uses, virtual reality, and communications, triggering a change in emphasis for the requirements. Many existing systems for constructing 3D models are built around specialized hardware resulting in a high cost, which often cannot satisfy the requirements of these new applications. This need has stimulated the use of digital imaging facilities (e.g., cameras) for 3D reconstruction of a scene.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for SFM sequencing using non-visual information. According to at least one example, an apparatus is provided for image processing. The apparatus includes at least one memory and at least one processor coupled to the at least one memory and configured to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; determine one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames; determine pairs of image frames from the one or more first image frames and the one or more second image frames that are determined to be similar based on image data of the scene in the one or more first image frames and the one or more second image frames; and process the pairs of image frames to reconstruct the scene in three dimensions (3D) comprising a reconstruction of an overlap of the first route and the second route.

In another example, a method for image processing, the method comprising: obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtaining a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; determining one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames; determining pairs of image frames from the one or more first image frames and the one or more second image frames that are determined to be similar based on image data of the scene in the one or more first image frames and the one or more second image frames; and processing the pairs of image frames to reconstruct the scene in three dimensions (3D) comprising a reconstruction of an overlap of the first route and the second route.

In another example, a non-transitory computer-readable medium is provided having stored thereon instructions that, when executed by one or more processors, cause the one or more processors to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; determine one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames; determine pairs of image frames from the one or more first image frames and the one or more second image frames that are determined to be similar based on image data of the scene in the one or more first image frames and the one or more second image frames; and process the pairs of image frames to reconstruct the scene in three dimensions (3D) comprising a reconstruction of an overlap of the first route and the second route.

In another example, an apparatus for image processing is provided. The apparatus includes: means for obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; means for obtaining a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; means for determining one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames; means for determining pairs of image frames from the one or more first image frames and the one or more second image frames that are determined to be similar based on image data of the scene in the one or more first image frames and the one or more second image frames; and means for processing the pairs of image frames to reconstruct the scene in three dimensions (3D) comprising a reconstruction of an overlap of the first route and the second route.

Aspects generally include a method, apparatus, system, computer program product, non-transitory computer-readable medium, user equipment, base station, wireless communication device, and/or processing system as substantially described herein with reference to and as illustrated by the drawings and specification.

In some aspects, one or more of the apparatuses described herein is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 1 is a diagram illustrating an example of a system performing a survey of wireless communication devices within an environment, in accordance with some aspects of the present disclosure.

FIG. 12 is a flow chart illustrating an example of a process for image processing, in accordance with some aspects of the present disclosure.

DETAILED DESCRIPTION

Figure 2:
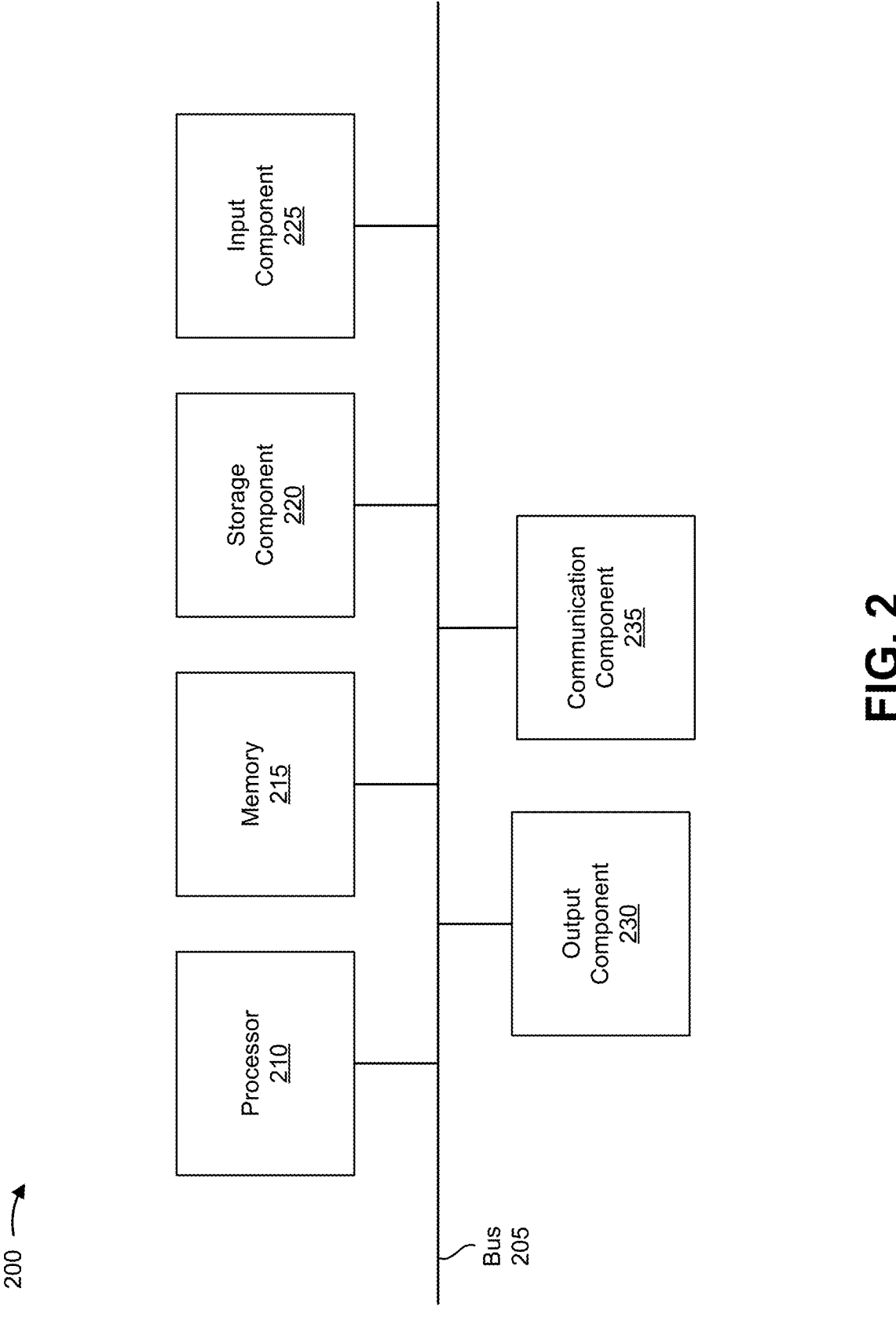
FIG. 2 is a diagram illustrating example components of a device, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Structure from motion (SFM) is the process of estimating the 3D structure of a scene from a set of two dimensional (2D) images (e.g., image frames) of the scene. SFM can be used in many applications, such as for 3D scanning, augmented reality, and visual simultaneous localization and mapping (vSLAM). Finding SFM involves finding correspondences between 2D images for the reconstruction of a 3D scene. To find correspondences between 2D images, features such as corner points (e.g., edges with gradients in multiple directions) can be tracked from one image to the next. The features detected from all the images will then be matched using a matching algorithm. Sometimes some of the matched features are incorrectly matched. As such, the matches may be filtered by using a filtering algorithm, such as a random sample consensus (RANSAC) algorithm, which can be used to remove outlier correspondences. The feature trajectories over time can be used to reconstruct their 3D positions and the camera's motion. An alternative method can be performed by using direct approaches, where geometric information (e.g., 3D structure and camera motion) can be directly estimated from the images, without intermediate abstraction to features or corners.

There are several approaches to SFM. One approach is an in incremental SFM, where camera poses are solved for and added one-by one-to the collection. Another approach is a global SFM, where the poses of all cameras are solved for at the same time. A somewhat intermediate approach is an out-of-core SFM, where several partial reconstructions are computed that are then integrated into a global solution.

In some cases, when conducting a survey (e.g., for inventory purposes) of a scene within an environment (e.g., a retail store), SFM may be employed for 3D reconstruction of the scene. As part of the survey, a survey system function can be defined where for all time t in a survey interval (e.g., a time duration of the survey), time can be mapped to position (e.g., which can be used for estimating the position of the surveying device within the environment during the survey), such that $\forall t$ in $[ts_i \ldots ts_j]$, $F{:}T{\rightarrow}P$ is defined, with $T \in \mathbb{R}$ and $P \in \mathbb{R}^3$, where T is time and P is position.

Using an uncontrolled (e.g., casual) video of a scene, SFM can be used to estimate the structure of the scene and pose (e.g., orientation and position) of the camera. Performing a survey for an indoor space (e.g., a retail store) as a single continuous event can be challenging due to the size of the space and/or the allowed level/nature of disruption to the surveying process. For example, a typical size of a retail store is approximately 1700 square meters.

Accretive collection of data in a scene can be used to incrementally construct the survey system function. Collecting data incrementally via partial tracks (e.g., routes) with some intersection with each other can lead to multiple SFM models associated with each survey run. Combining the data collected from the partial tracks (e.g., which are related to each other in some way) using SFM in an optimal (or efficient) and unambiguous manner can be significantly challenging. Additionally, when there are no overlapping sections of the scene between different partial tracks, the challenge complexity can increase by several times.

Typically, a standard solution using SFM for conducting a survey (e.g., for inventory purposes) of a scene (e.g., indoor space of a retail store) within an environment (e.g., a retail store) involves performing different data collection runs using a casual video recording of a random section of the indoor space or crowd sourcing. One key assumption between each data collection run is to have overlapping sections in the recorded video.

In one or more cases, SFM can be performed as a sequential matching approach such that each run is processed separately, leading to multiple reconstruction models. The processing of each run can involve sequentially matching features in a set of overlapping images. Then, the reconstruction models can be combined together by relying on the transformation between overlapping images of the reconstruction models. However, if the common images in the reconstruction models have different inliers (e.g., an artifact of local bundle adjustment), it can be difficult to reconstruct the scene from the reconstruction models.

In some cases, SFM can be performed as a continuous matching approach such that all the data is processed at once through exhaustive matching. This process can be time consuming with a very high complexity, such as complexity of $O(n^4)$, and can lead to ambiguous results due to missing matching restrictions (e.g., unlike the sequential matching approach). As such, an improved technique for SFM sequencing of image frames for 3D reconstruction of a scene can be beneficial.

In some aspects of the present disclosure, systems, apparatuses, methods (also referred to as processes), and computer-readable media (collectively referred to herein as "systems and techniques") are described herein for providing SFM sequencing using non-visual information. In one or more examples, the systems and techniques employ the use of non-visual data to improve the accuracy and efficiency of SFM for 3D reconstruction of a scene. For example, when performing accretive data collection for surveying a scene, a snapshot of the scene (e.g., video) is overlaid with additional non-visual information (e.g., fingerprints) for SFM. The non-visual information can be used to assist in reconciling the visual data of the image frames. In one or more examples, each fingerprint can include addresses of wireless communications devices located within the scene and sensor data associated with the wireless communication devices.

In one or more examples, fingerprints can be used to generate image pairs (e.g., pairs of image frames) for sequential matching in case of overlapping sections of partial tracks (e.g., routes). In some examples, fingerprints may be used to generate relative positioning of the routes in reconstructed models. In one or more examples, the systems and techniques can provide the convergence of routes to a global coordinate system, even after accretive data collection. In some examples, the systems and techniques can allow for the detection of blind spots in routes with non-overlapping sections.

In one or more examples, the systems and techniques provide a solution to generate a sequence through commonality of non-visual features in overlapping regions. This solution solves for two unknowns, which are not independent. The first unknown is the overlapping fingerprint section between the two routes (e.g., the time interval on each of the routes, where overlapping fingerprints are reported). The second unknown is an overlapping scene section between two routes (e.g. which ranges of image frames from a first route and a second route capture common areas of space).

In some examples, the systems and techniques provide a solution for relative route positioning by fingerprint matching in non-overlapping routes using hysteresis of sensor measurements and range measurements. This solution solves for three unknowns. The first unknown is a non-overlapping fingerprint section between two routes (e.g., the time interval on each of the routes, where no overlapping fingerprints are reported). The second unknown is the transformation between two route coordinate systems (e.g., in the absence of overlapping scene sections, the orientation of one route relative to the other can be estimated). The third unknown is blind spots and associated last seen section images.

In one or more aspects, during operation of the systems and techniques for image processing, a first device (e.g., a surveying device) traversing a first route can obtain a first video of a scene and a plurality of first non-visual data, where the first video includes a plurality of first image frames and each first non-visual data of the plurality of first non-visual data is associated with one or more respective first image frames of the plurality of first image frames. A second device traversing a second route can obtain a second video of the scene and second non-visual data, where the second video includes a plurality of second image frames and each second non-visual data of the plurality of second non-visual data is associated with one or more respective second image frames of the plurality of second image frames. In one or more examples, the first device and the second device may be the same device or different devices. In some examples, the first device and the second device may each include a camera and a reader. In one or more examples, the device is capable of capturing "signals" (e.g., non-visual data measurements), and associating a timestamp to these measurements such that these measurements can be related to image frames of captured video. As such, timestamps assigned to each image frame and timestamps assigned to each measurement can be related (e.g., corresponding).

In some examples, the respective first non-visual data and the respective second non-visual data can include respective addresses for each wireless communication device of a plurality of wireless communication devices within the scene and respective fingerprints associated with each of the addresses. In one or more examples, each address of the addresses can be a respective identification (ID) number for each wireless communication device of the plurality of wireless communication devices. In some examples, each wireless communication device of the plurality of wireless communication devices may be an electronic shelf label (ESL). In one or more examples, each respective fingerprint can be based on sensor data. In some examples, the sensor data may be received signal strength indicator (RSSI) data, magnetometer data, inertial measurement unit (IMU) data, acoustic data, light data (e.g., (light detection and ranging (LIDAR) data or any other type of light data), any combination thereof, and/or other type of sensor data.

In one or more examples, also during operation of the systems and techniques for image processing, one or more processors (e.g., which may be implemented within the device or remote from the device) can compare the plurality of first non-visual data of the first route with the plurality of second non-visual data of the second route. The one or more processors can determine one or more first image frames of the plurality of first image frames that are similar to one or more second image frames of the plurality of second image frames based on determining (e.g., based on comparing the plurality of first non-visual data with the plurality of second non-visual data) first non-visual data of the plurality of first non-visual data associated with the one or more first image frames is similar to second non-visual data of the plurality of second non-visual data associated with the one or more second image frames. The one or more processors can determine pairs of image frames from the one or more first image frames and the one or more second image frames that are determined to be similar based on image data of the scene in the one or more first image frames and the one or more second image frames. In some examples, the determining of the pairs of image frames from the one or more first image frames and the one or more second image frames may be further based on determining similarities in the image data of the scene in the one or more first image frames and the one or more second image frames. In one or more examples, each pair of the pairs of image frames can include a first image frame of the one or more first image frames and a second image frame of the one or more second image frames. The one or more processors can process the pairs of image frames to reconstruct the scene in three dimensions (3D), which can include a reconstruction of an overlap of the first route and the second route. In one or more examples, the processing can include SFM processing.

In some aspects, also during operation of the systems and techniques for image processing, the one or more processors can determine an angle difference between a first coordinate system of a first model of the first route with a second coordinate system of a second model of the second route based on comparing the plurality of first non-visual sensor data of the first route with the plurality of second non-visual data of the second route. The one or more processors can adjust the first coordinate system or the second coordinate system based on the angle difference such that the first coordinate system is aligned with the second coordinate system.

In one or more aspects, also during operation of the systems and techniques for image processing, the one or more processors can compare first non-visual sensor data associated with a wireless communication device of the plurality of first non-visual sensor data of the first route with second non-visual sensor data associated with the wireless communication device of the plurality of second non-visual sensor data of the second route. The one or more processors can determine a spring constant (k) between a first image frame of the plurality of first image frames associated with the first non-visual sensor data associated with the wireless communication device and a second image frame of the plurality of second image frames associated with the second non-visual sensor data associated with the wireless communication device based on a first amplitude of the first non-visual sensor data associated with the wireless communication device and a second amplitude of the second non-visual sensor data associated with the wireless communication device. The one or more processors can adjust a first form of a first model of the first route and a second form of a second model of the second route with respect to each other based on the spring constant.

Additional aspects of the present disclosure are described in more detail below.

As previously mentioned above, a survey (e.g., for inventory purposes) of a scene (e.g., indoor space of a retail store) within an environment (e.g., a retail store) can involve performing different data collection runs using a video recording of a random section of the indoor space. FIG. 1 shows an example of a survey of a scene within an environment of a retail store.

In particular, FIG. 1 is a diagram illustrating an example of a system 100 for performing a survey of a scene with wireless communication devices 110 within an environment (e.g., a retail store). In one or more examples, the wireless communication devices 110 may be in the form of electronic shelf labels (ESLs). ESLs are increasingly used in retail. For example, ESLs may be associated with respective items (e.g., goods for sale) within the environment (e.g., the retail store). ESLs may be deployed throughout the store without recording exactly where the ESLs are located within the store. In FIG. 1, the wireless communication devices 110 (e.g., ESLs) may be associated with items located on gondolas 120 within the store.

A survey of the scene may be performed using a survey device 130 being moved around the store by a surveyor 140 in the form of a sales associate. The survey device 130 may be associated with a person (e.g., a sales associate as shown in FIG. 1) or mounted on equipment, such as a picking cart or a robot. In one or more examples, the survey device 130 may include a camera and a reader, which can include other sensors (e.g., an RF sensor, magnetometer sensor, an inertial measurement unit (IMU), etc.).

During the survey of the scene, as the surveyor 140 walks (e.g., traverses) a route 150 within the store, the survey device 130 can obtain video (e.g., within the field of view 160 of the camera of the survey device 130) and non-visual data. The non-visual data may include, but is not limited to, received signal strength indicator (RSSI) data, magnetometer data, and/or IMU data as well as include an address of a wireless communication device associated with the data.

In one or more examples, during the surveying as the surveyor 140 walks (e.g., traverses) the route 150 and is obtaining video (e.g., including a plurality of image frames) of the scene, the survey device 130 may transmit an RF signal, such as a Bluetooth low energy (BLE) signal or a Wi-Fi signal, within its antenna field of view. The wireless communication devices 110 (e.g., ESLs) that receive this RF signal may radiate a response signal (e.g., a BLE beacon 170) back to the survey device 130. The surveying device 130 can then receive this response signal (e.g., BLE beacon 170) and obtain measurements (e.g., RSSI data) of this response signal. The obtained RSSI data is a form of non-visual data that can be obtained by the survey device 130 during the survey. This non-visual data can be used to assist in reconciling the visual data of the image frames (of the video) for SFM.

FIG. 2 is a diagram illustrating example components of a device 200, in accordance with the present disclosure. Device 200 may correspond to a wireless communication device (e.g., wireless communication device 110 of FIG. 1) and/or a survey device (e.g., survey device 130 of FIG. 1). In some aspects, the wireless communication device and/or the survey device may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., an indoor location, component, or system) that can be based on a plan-o-gram of an environment in which the device 200 is located, a global positioning system (GPS) component, a global navigation satellite system (GNSS) component, any combination thereof, and/or other location component) and/or a sensor on the device 200 for sensing information (e.g., a camera, an inertial measurement unit (IMU), a magnetometer, an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas (e.g., one or more radio frequency sensors) for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
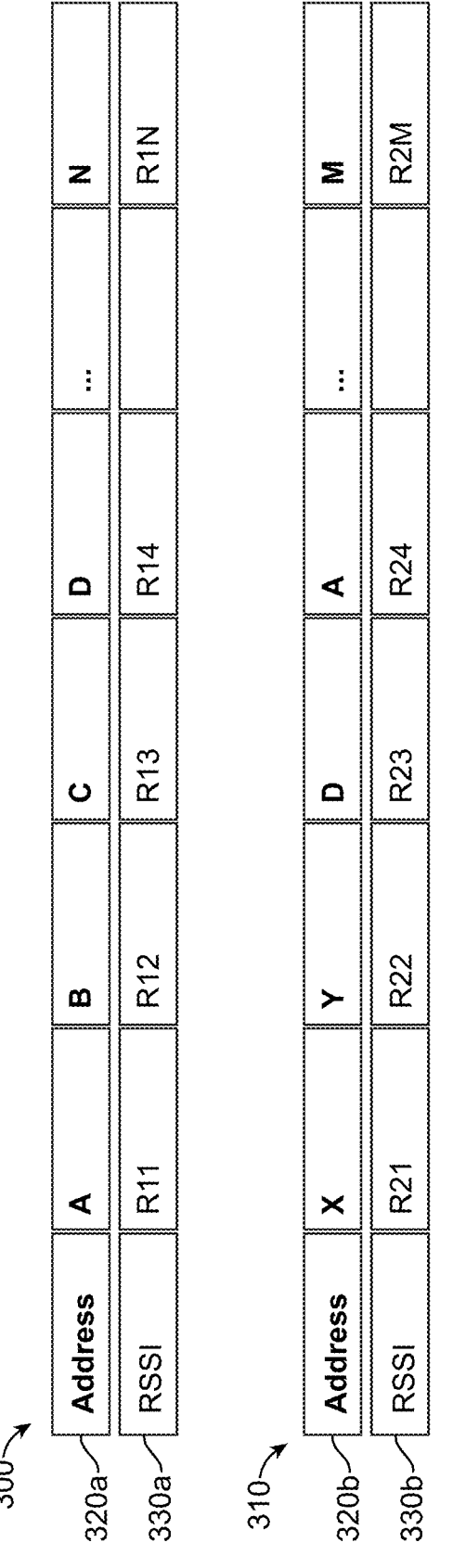
FIG. 3 is a diagram illustrating two examples of fingerprints (e.g., RF fingerprints, magnetometer fingerprints, acoustic fingerprints, and light fingerprints), in accordance with some aspects of the present disclosure.

In one or more aspects, fingerprints (e.g., RSSI fingerprints) can be generated from non-visual data (e.g. RSSI data) obtained by a survey device (e.g., survey device 130 of FIG. 1) during a survey of a scene. In one or more examples, fingerprints (e.g., RF fingerprints, magnetometer finger-prints, acoustic fingerprints, and light fingerprints) may be generated from types of data other than RSSI data, such as from RF data, magnetometer data, acoustic data, light data, any combination thereof, and/or other data. FIG. 3 is a diagram illustrating two examples of fingerprints 300, 310 (e.g., RSSI fingerprints). In FIG. 3, each fingerprint 300, 310 is shown to include an ordered listing of addresses 320*a*, 320*b* (e.g., IDs) of wireless communication devices and RSSIs 330*a*, 330*b* of response signals received from the wireless communication devices. For example, fingerprint 300 includes an RSSI 330*a* of strength R11 for a response signal received from a wireless communication device with an address 320*a* (e.g., an ID) of A, an RSSI 330*a* of strength R12 for a response signal received from a wireless commu-nication device with an address 320*a* (e.g., an ID) of B, an RSSI 330*a* of strength R13 for a response signal received from a wireless communication device with an address 320*a* (e.g., an ID) of C, an RSSI 330*a* of strength R14 for a response signal received from a wireless communication device with an address 320*a* (e.g., an ID) of D . . . an RSSI 330*a* of strength R1N for a response signal received from a wireless communication device with an address 320*a* (e.g., an ID) of N.

In one or more examples, the listing of RSSIs 330*a*, 330*b* in each of the fingerprints 300, 310 may be ordered from the strongest RSSIs 330*a*, 330*b* to the weakest RSSIs 330*a*, 330*b*. For example, the RSSI 330*a* with a strength of R11 is the strongest RSSI 330*a* in fingerprint 300, and the RSSI 330*a* with a strength of R1N is the weakest RSSI 330*a* in fingerprint 300.

In some examples, fingerprints may have a lot of overlap of common wireless communication devices (e.g., addresses 320*a*, 320*b*), or may have little to no overlap. For example, in FIG. 3, the fingerprints 300, 310 have overlap of common wireless communication devices with addresses 320*a*, 320*b* of A and D.

Figure 4:
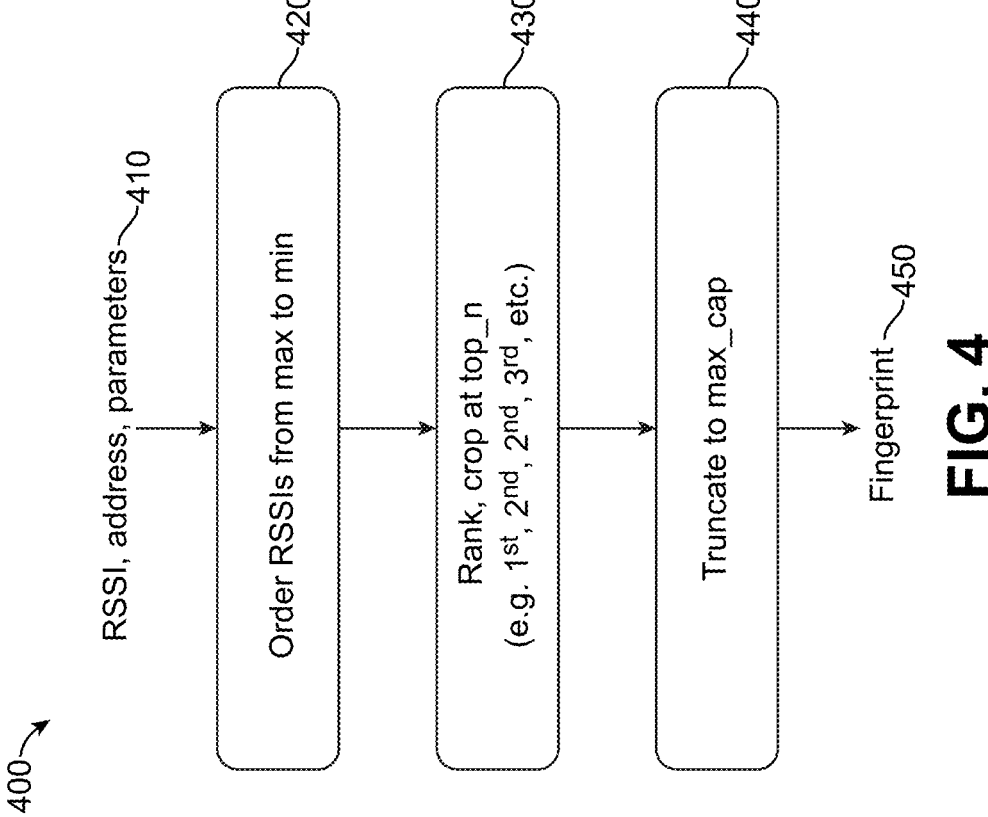
FIG. 4 is a flow chart illustrating an example of a process for generating a fingerprint, in accordance with some aspects of the present disclosure.

FIG. 4 is a flow chart illustrating an example of a process 400 for generating a fingerprint. In FIG. 4, during operation of the process 400, at step 410, during a survey of a scene, a survey device (e.g., survey device 130 of FIG. 1) can obtain RSSIs, addresses of the associated wireless commu-nication devices (e.g., ESLs) and, optionally, other param-eters. At step 420, the survey device can order the obtained RSSIs from maximum (strongest) to minimum (weakest). At step 430, the survey device can rank (e.g., first, second, third, fourth, etc.) the addresses (e.g., IDs) of the wireless communication devices (e.g., ESLs) based on the order of their associated RSSIs. As such, the address of the wireless communication device with the strongest RSSI can be ranked first. The ranking of the RSSIs can stop (e.g., be cropped) at a number equal to top_n (e.g., 12). At step 440, the survey device can truncate the maximum number of elements of the fingerprint to be equal to max_cap (e.g., 10). After the maximum number of elements of the fingerprint is truncated, at step 450, the final resultant fingerprint can be generated.

Figure 5:
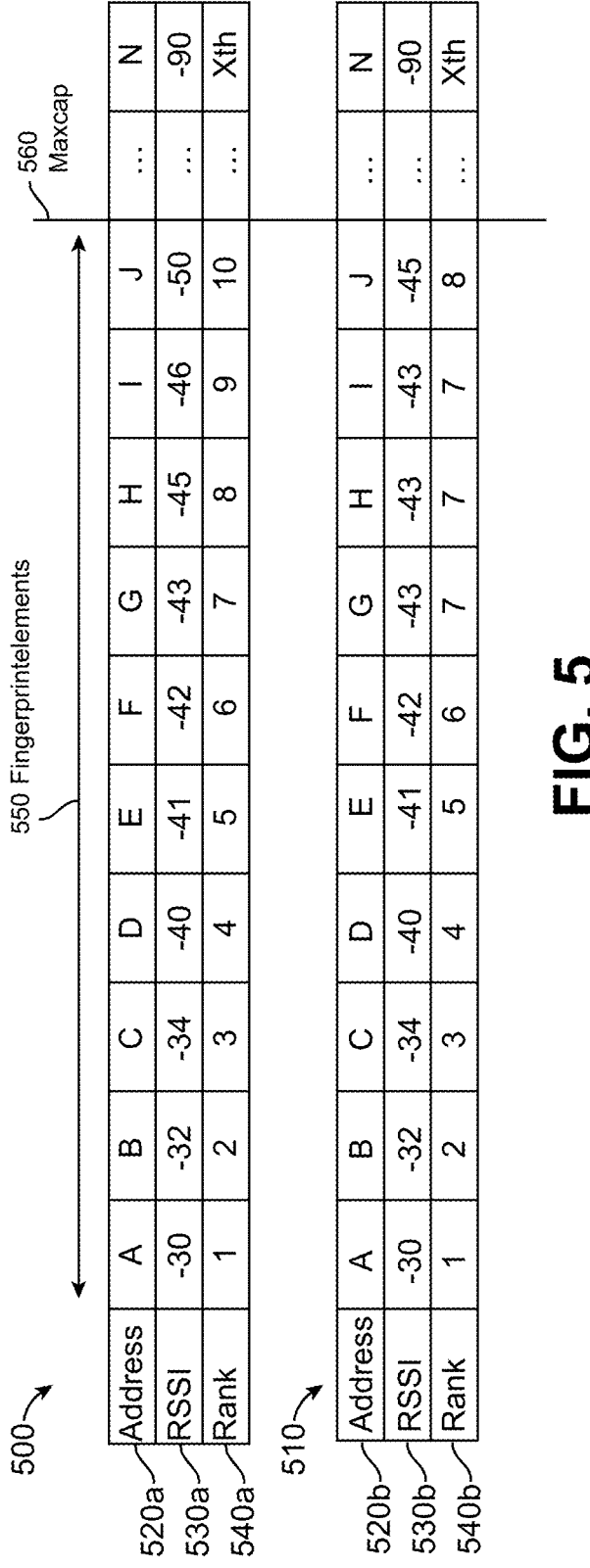
FIG. 5 is a diagram illustrating the generation of two example fingerprints, in accordance with some aspects of the present disclosure.

FIG. 5 is a diagram illustrating the generation of two example fingerprints 500, 510. In FIG. 5, each fingerprint 500, 510 is shown to include an ordered listing of addresses 520*a*, 520*b* (e.g., IDs) of wireless communication devices and RSSIs 530*a*, 530*b* of response signals received from the wireless communication devices, along with a rank 540*a*, 540*b* of the wireless communication devices. For example, fingerprint 500 includes an RSSI 530*a* of strength −30 decibels (dB) for a response signal received from a wireless communication device with an address 520*a* (e.g., an ID) of A and a rank 540*a* of 1.

In FIG. 5, each fingerprint 500, 510 is shown to have a maximum capacity (max cap) 560 of 10 and, as such, is limited to a total of 10 fingerprint elements 550. The fingerprints 500, 510 in FIG. 5 are shown to have a lot of overlap of common wireless communication devices (e.g., addresses 520*a*, 520*b*). For example, in FIG. 5, the finger-prints 500, 510 have overlap of common wireless commu-nication devices with addresses 520*a*, 520*b* of A, B, C, D, E, F, G, H, I, J, and N.

As previously mentioned, in one or more aspects, the systems and techniques provide SFM sequencing using non-visual information. In one or more examples, the sys-tems and techniques utilize non-visual data to improve the accuracy and efficiency of SFM for 3D reconstruction of a scene. For example, when performing accretive data collec-tion for surveying a scene, a snapshot of the scene (e.g., video) can be overlaid with additional non-visual informa-tion (e.g., fingerprints) for SFM. The non-visual information may be used to assist in reconciling the visual data of the image frames. In one or more examples, each fingerprint may include addresses of wireless communications devices located within the scene and sensor data associated with the wireless communication devices.

Figure 6:
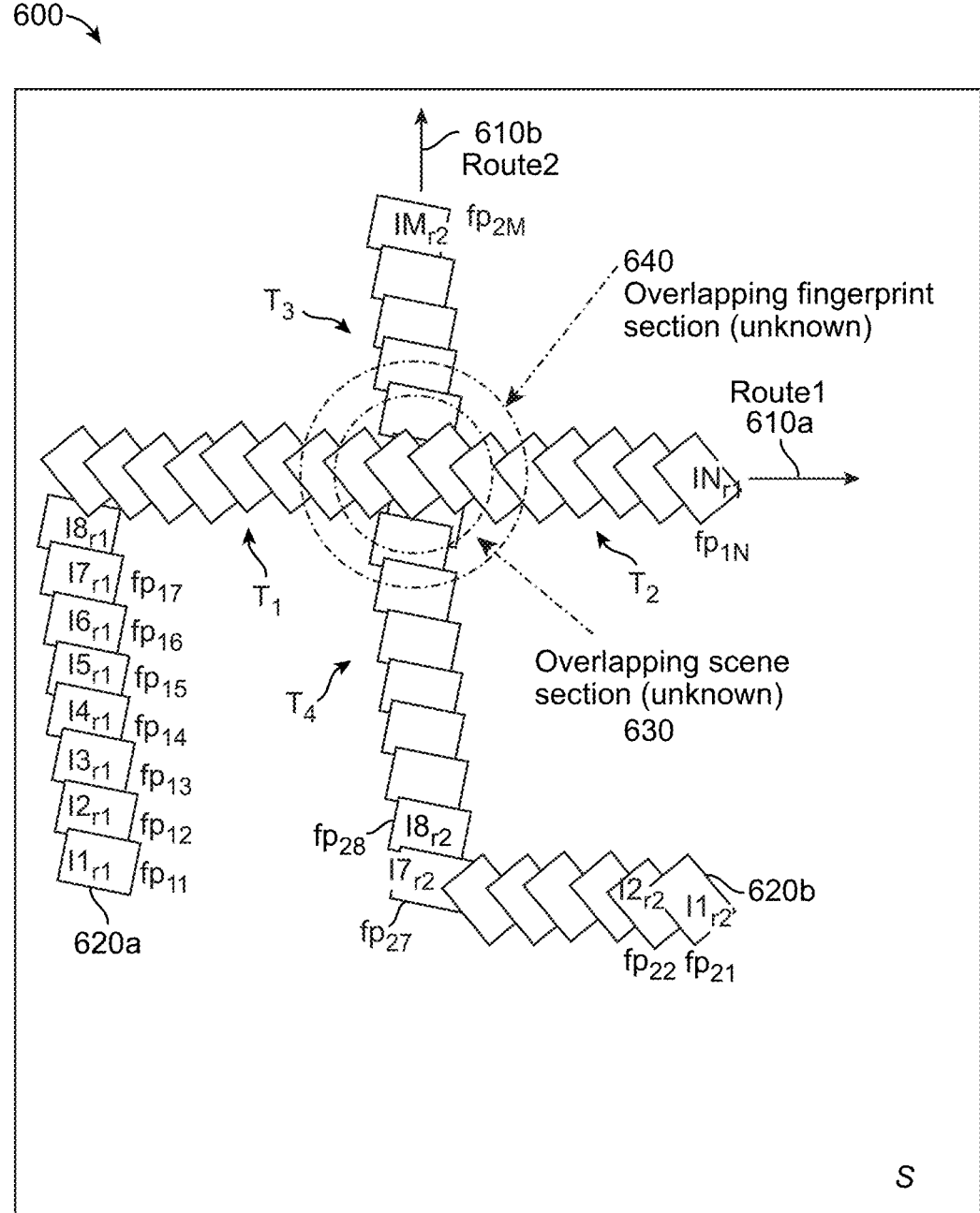
FIG. 6 is a diagram illustrating an example of generating a sequence of image frames through commonality of non-visual features within overlapping regions, in accordance with some aspects of the present disclosure.

In one or more aspects, the systems and techniques provide a solution to generate a sequence through common-ality of non-visual features in overlapping regions. FIG. 6 shows an example of this solution. The solution illustrated in FIG. 6 solves for two unknowns. The first unknown is the overlapping fingerprint section 640 between the two routes (e.g., the time interval on each of the routes, Route 1 610*a* and Route 2 610*b*, where overlapping fingerprints are reported). The second unknown is an overlapping scene section 630 between two routes (e.g. which ranges of images from Route 1 610*a* and Route 2 610*b* capture common areas of space S).

In particular, FIG. 6 is a diagram illustrating an example 600 of generating a sequence of image frames through commonality of non-visual features within overlapping regions. In FIG. 6, two routes (e.g., Route 1 610*a* and Route 2 610*b*) within a space S are shown. Space S is a space (e.g., a retail store) that needs to be surveyed.

A survey device (e.g., survey device 130 of FIG. 1) can survey a scene within space S by performing data collection (e.g., collecting video and non-visual data) along the two routes (e.g., Route 1 610*a* and Route 2 610*b*). During the surveying, the survey device can first collect data (e.g., video and non-visual data) at a certain sample rate, while traversing Route 1 610*a* during a time period including times T1 and T2. The survey device can then proceed to collect data (e.g., video and non-visual data) at the certain sample rate, while traversing Route 2 610*b* during a subse-quent time period including times T3 and T4. In one or more examples, one or more survey devices may be employed to collect the data for Route 1 610*a* and Route 2 610*b*. For example, a first survey device may collect the data for Route 1 610*a* and a second survey device may collect the data for Route 2 610*b*.

The video collected during the survey by the survey device contains a plurality of image frames. For example, the video (e.g., first video) collected by the survey device while traversing Route 1 610*a* includes a plurality of image frames 620*a* (e.g., first image frames), which are labeled in FIG. 6 from $I1_{r1}$ to $IN_{r1}$. The video (e.g., second video) collected by the survey device while traversing Route 2

$610b$ includes a plurality of image frames $620b$ (e.g., second image frames), which are labeled in FIG. 6 from $I1_{12}$ to $IM_{r2}$.

During the collection of video by the survey device, the survey device may also simultaneously collect non-visual data. For example, the non-visual data (e.g., first non-visual data) collected by the survey device while traversing Route 1 $610a$ includes a plurality of non-visual data (e.g., a plurality of first non-visual data), which is labeled in FIG. 6 from $fp_{11}$ to $fp_{1N}$. The non-visual data (e.g., second non-visual data) collected by the survey device while traversing Route 2 $610b$ includes a plurality of non-visual data (e.g., a plurality of second non-visual data), which is labeled in FIG. 6 from $fp_{21}$ to $fp_{2M}$. As shown in FIG. 6, the non-visual data collected close in time with an image frame(s) may be associated with a particular image frame(s). For example, the non-visual data $fp_{11}$ is collected (e.g., obtained) close in time with image frame $620a$ $I1_{r1}$ and, as such, the non-visual data $fp_{11}$ may be associated with the image frame $620a$ $I1_{r1}$. As such, the non-visual data (e.g., including fingerprints) can be represented as $fp_{rj}$, where $r \in \mathbb{R}$ is route ID and $j \in \mathbb{R}$ is image ID. The non-visual data (e.g., fingerprints) may include sensor data, such as RF (e.g., BLE and/or Wi-Fi) measurements (e.g., RSSI data), IMU data, and/or magnetometer data.

In one or more examples, the first non-visual data and the second non-visual data can include respective addresses for each wireless communication device (e.g., wireless communication device 110 of FIG. 1) of a plurality of wireless communication devices located within the scene, and can include respective fingerprints associated with each of the addresses. In one or more examples, each address of the addresses can be a respective identification (ID) number, such as a medium access control (MAC) address, for each wireless communication device of the plurality of wireless communication devices. In some examples, each wireless communication device of the plurality of wireless communication devices may be a peripheral device, such as an ESL. In one or more examples, each fingerprint can be based on sensor data. In some examples, the sensor data may be RSSI data, magnetometer data, IMU data, acoustic data, light data, any combination thereof, and/or other type of sensor data.

One or more processors (e.g., which may be implemented within the survey device itself and/or located remote from the survey device) can then compare the plurality of first non-visual data (e.g., RSSI data) of Route 1 $610a$ with the plurality of second non-visual data (e.g., RSSI data) of Route 2 $610b$. The one or more processors can determine one or more first image frames of the plurality of first image frames that are similar to one or more second image frames of the plurality of second image frames, based on determining first non-visual data (e.g., RSSI data) of the plurality of first non-visual data associated with the one or more first image frames is similar (e.g., similar RSSI from common wireless communication devices(s)) to second non-visual data (e.g., RSSI data) of the plurality of second non-visual data associated with the one or more second image frames. In FIG. 6, these similar one or more first image frames and one or more second image frames are shown to be located within the overlapping fingerprint section 640.

The one or more processors may then determine pairs of image frames from the one or more first image frames and the one or more second image frames that are determined to be similar (e.g., from the first and second image frames that are contained within the overlapping fingerprint section 640). Each pair of image frames may include one first image frame (e.g., collected on Route 1 $610a$) and one second image frame (e.g., collected on Route 2 $610b$). The one or more processors can determine the pairs of image frames from the one or more first image frames and the one or more second image frames that are determined to be similar based on image data of the scene in the one or more first image frames and the one or more second image frames. In some examples, the determining of the pairs of image frames from the one or more first image frames and the one or more second image frames may be further based on determining similarities in the image data (e.g., similarities in the features and/or the nature of the image) of the scene in the one or more first image frames and the one or more second image frames. As such, the collected video may be transformed (e.g., by the one or more processors) to set of image frames (e.g., by removing and/or pruning unwanted or redundant images based on the nature of image and/or associated features) with associated timestamps for each image frame, such that $\forall T = [t_1, t_2, \ldots, t_n], \langle t_n, Ifr \rangle$, where $f \in \mathbb{R}$ is the image frame number and $r \in \mathbb{R}$ is the route identification number. In FIG. 6, these determined pairs of image frames are shown to be located within the overlapping scene section 630. The one or more processors can then process the pairs of image frames to reconstruct the scene in three dimensions (3D) including a reconstruction of an overlap of Route 1 $610a$ and Route 2 $610b$. In one or more examples, the processing can include SFM processing.

Figure 7:
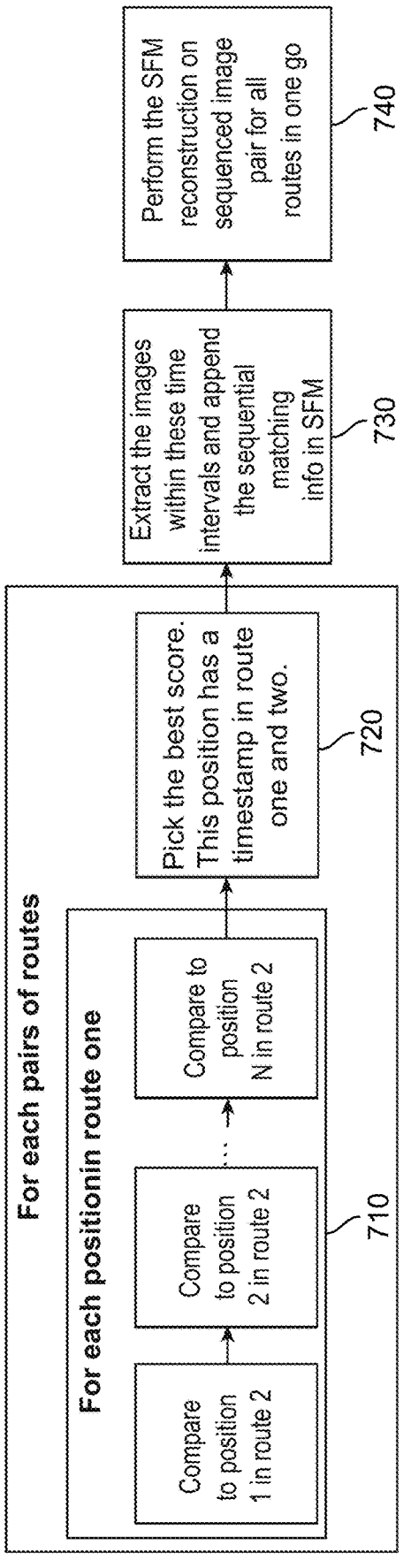
FIG. 7 is a flow chart illustrating an example of a process for the generating of the sequence of image frames as shown in FIG. 6, in accordance with some aspects of the present disclosure.

FIG. 7 is a flow chart illustrating an example of a process 700 for the generating of the sequence of image frames as shown in FIG. 6. In FIG. 7, during operation of the process 700, at block 710, for each pair of routes (e.g., Route 1 $610a$ and Route 2 $610b$), for each position in Route 1 $610a$: one or more processors can compare the non-visual data (e.g., fingerprint) to the non-visual data in position 1 in Route 2 $610b$, compare to the non-visual data in position 2 in Route 2 $610b$, ... compare to the non-visual data in position N in Route 2 $610b$.

There are two examples techniques that may be employed for performing the comparisons of the non-visual data (e.g., fingerprints) of the two routes. One technique may be used when comparing non-visual data including RF data, and another technique may be used when comparing non-visual data including magnetometer data. For a first technique for comparing non-visual data including RF data (e.g., RSSI data), a scoring system may be employed that may involve taking the intersection of the addresses (e.g., wireless communication devices addresses) seen on two fingerprints. The delta RSSI changes in fingerprint one and, then, fingerprint two can be calculated. A pair of addresses may be scored by using the absolute difference of delta RSSI between them. For second technique for comparing non-visual data including magnetometer data, a section of magnetometer data from the first route (e.g., Route 1 $610a$) may be selected from the time series. This section of magnetometer data can then be cross correlated with all of the magnetometer data obtained in the second route (e.g., Route 2 $610b$).

In one or more examples, the comparisons may either be performed in a non-optimal exhaustive way with complexity of $O(n^2)$, or an optimal method can be developed that down samples the fingerprint points in each route (e.g., neighbouring fingerprint samples in a route might not be very different, and can be dropped) focusing on the fingerprint samples significantly different from the previous sample in a route.

After the comparisons of the non-visual data in the two routes have been performed, at block 720, the one or more processors can choose the non-visual data (e.g., fingerprints) from Route 1 $610a$ and Route 2 $610b$ that have the most similarities with each other (e.g., choose the fingerprints that have the best score). The position of that chosen non-visual data (e.g., fingerprint) has a timestamp in Route 1 610*a* and in Route 2 610*b*. These timestamps with a +/−delta produce two sets of time intervals, each belonging to a route. For example, as shown in FIG. 6, Route 1 610*a* has a time interval from time stamps T1 to T2, and Route 2 610*b* has a time interval from time stamps T3 to T4. These time intervals denote the overlapping fingerprint section 640 of FIG. 6.

At block 730, the one or more processors can then extract the image frames located within these time intervals (e.g., located within the overlapping fingerprint section 640), and append the sequential matching information in SFM. In one or more examples, the appended sequential matching information can involve creating a pair of image frames containing the extracted image frames in addition to pairs of image frames that belong only to a route. At block 740, the one or more processors can perform the SFM reconstruction of the scene based on the sequenced pairs of image frames for all the routes in one go. The SFM reconstruction can involve performing feature extraction on each image, followed by performing feature matching as per sequenced pair of images generated in previous block (e.g., block 730), which can lead to a single reconstruction model output registering the images from all the routes in one go.

Figure 8:
FIG. 8 is a diagram illustrating an example of relative route positioning by fingerprint matching in non-overlapping routes, in accordance with some aspects of the present disclosure.

In one or more aspects, the systems and techniques provide a solution for relative route positioning by fingerprint matching in non-overlapping routes using hysteresis of sensor measurements and range measurements. FIG. 8 shows an example of this solution. In one or more examples, this solution may be performed as post-processing to SFM. This solution solves for three unknowns. The first unknown is a non-overlapping fingerprint section between two routes (e.g., the time interval on each of the routes, where no overlapping fingerprints are reported). The second unknown is the transformation between two route coordinate systems (e.g., in the absence of overlapping scene sections, the orientation of one route relative to the other can be estimated). The third unknown is blind spots and associated last seen section images.

In particular, FIG. 8 is a diagram illustrating an example 800 of relative route positioning by fingerprint matching in non-overlapping routes. In FIG. 8, two routes (e.g., Route 1 810*a* and Route 2 810*b*) within a space S are shown. In one or more examples, space S is a space (e.g., a retail store) that needs to be surveyed. In FIG. 8, the two routes (e.g., Route 1 810*a* and Route 2 810*b*) are shown to not be overlapping (e.g., as shown in the two non-overlapping fingerprint sections 830*a*, 830*b*). Each route (e.g., Route 1 810*a* and Route 2 810*b*) in FIG. 8 is shown to have an associated coordinate system. For example, Route 1 810*a* has a coordinate system of $X_1$, $Y_1$. Route 2 810*b* has a coordinate system $X_2$, $Y_2$. As shown in FIG. 8, the coordinate systems of the routes are not aligned with one another.

A survey device (e.g., survey device 130 of FIG. 1) may survey a scene within space S by performing data collection (e.g., collecting video and non-visual data) along the two routes (e.g., Route 1 810*a* and Route 2 810*b*). During the surveying, the survey device may first collect data (e.g., video and non-visual data) at a certain sample rate, while traversing Route 1 810*a* during a time period including times T1, T2, T3, and T4. The survey device can then proceed to collect data (e.g., video and non-visual data) at the certain sample rate, while traversing Route 2 810*b* during a subsequent time period including times T5, T6, T7, and T8. In one or more examples, one or more survey devices may be employed to collect the data for Route 1 810*a* and Route 2 810*b*. For example, a first survey device may collect the data for Route 1 810*a* and a second survey device may collect the data for Route 2 810*b*.

The video collected during the survey by the survey device includes a plurality of image frames. For example, the video (e.g., first video) collected by the survey device while traversing Route 1 810*a* includes a plurality of image frames 820*a* (e.g., first image frames), which are labeled in FIG. 8 from $I1_{r1}$ to $IN_{r1}$. The video (e.g., second video) collected by the survey device while traversing Route 2 810*b* includes a plurality of image frames 820*b* (e.g., second image frames), which are labeled in FIG. 8 from $I1_{r2}$ to $IM_{r2}$.

During the collection of video by the survey device, the survey device can also simultaneously collect non-visual data. The non-visual data (e.g., first non-visual data) collected by the survey device while traversing Route 1 810*a* includes a plurality of non-visual data (e.g., a plurality of first non-visual data), which is labeled in FIG. 8 from $fp_{11}$ to $fp_{1N}$. The non-visual data (e.g., second non-visual data) collected by the survey device while traversing Route 2 810*b* includes a plurality of non-visual data (e.g., a plurality of second non-visual data), which is labeled in FIG. 8 from $fp_{21}$ to $fp_{2M}$.

As shown in FIG. 8, the non-visual data collected close in time with an image frame(s) may be associated with a particular image frame(s). For example, the non-visual data $fp_{11}$ is collected (e.g., obtained) close in time with image frame 820*a* $I1_{r1}$ and, as such, the non-visual data $fp_{11}$ may be associated with the image frame 820*a* $I1_{r1}$. The non-visual data (e.g., fingerprints) may include sensor data, such as RF (e.g., BLE and/or Wi-Fi) measurements (e.g., RSSI data), IMU data, and/or magnetometer data. In one or more examples, the first non-visual data and the second non-visual data can include respective addresses for each wireless communication device (e.g., wireless communication device 110 of FIG. 1 in the form of an ESL) of a plurality of wireless communication devices located within the scene, and can include respective fingerprints associated with each of the addresses. In one or more examples, each address of the addresses can be a respective ID number (e.g., a MAC address) for each wireless communication device of the plurality of wireless communication devices. In one or more examples, each fingerprint may be based on sensor data. In some examples, the sensor data may be RSSI data, magnetometer data, IMU data, acoustic data, light data, any combination thereof, and/or other type of sensor data.

One or more processors (e.g., which may be implemented within the survey device itself and/or located remote from the survey device) can then compare the plurality of first non-visual data (e.g., magnetometer data) of Route 1 810*a* with the plurality of second non-visual data (e.g., magnetometer data) of Route 2 810*b*. The one or more processors can determine an angle difference between a first coordinate system $(X_1, Y_1)$ of a first model (e.g., shown in FIG. 8) of the Route 1 810*a* with a second coordinate system $(X_2, Y_2)$ of a second model (e.g., shown in FIG. 8) of the Route 2 810*b*, based on comparing the plurality of first non-visual sensor data (e.g., magnetometer data) of the Route 1 810*a* with the plurality of second non-visual data (e.g., magnetometer data) of the Route 2 810*b*. The one or more processors can then adjust (e.g., adjust the orientation and/or translation) the first coordinate system $(X_1,Y_1)$ or the second coordinate system $(X_2, Y_2)$ based on the angle difference such that the first coordinate system $(X_1, Y_1)$ is aligned with the second coordinate system $(X_2, Y_2)$. In one or more examples, the first coordinate system $(X_1,Y_1)$ and/or the second coordinate system $(X_2, Y_2)$ can be adjusted such that the Y-axis is pointed to a north heading. In some examples, the first coordinate system $(X_1, Y_1)$ and/or the second coordinate system $(X_2, Y_2)$ can be adjusted such that the routes are closer together.

Figure 9:
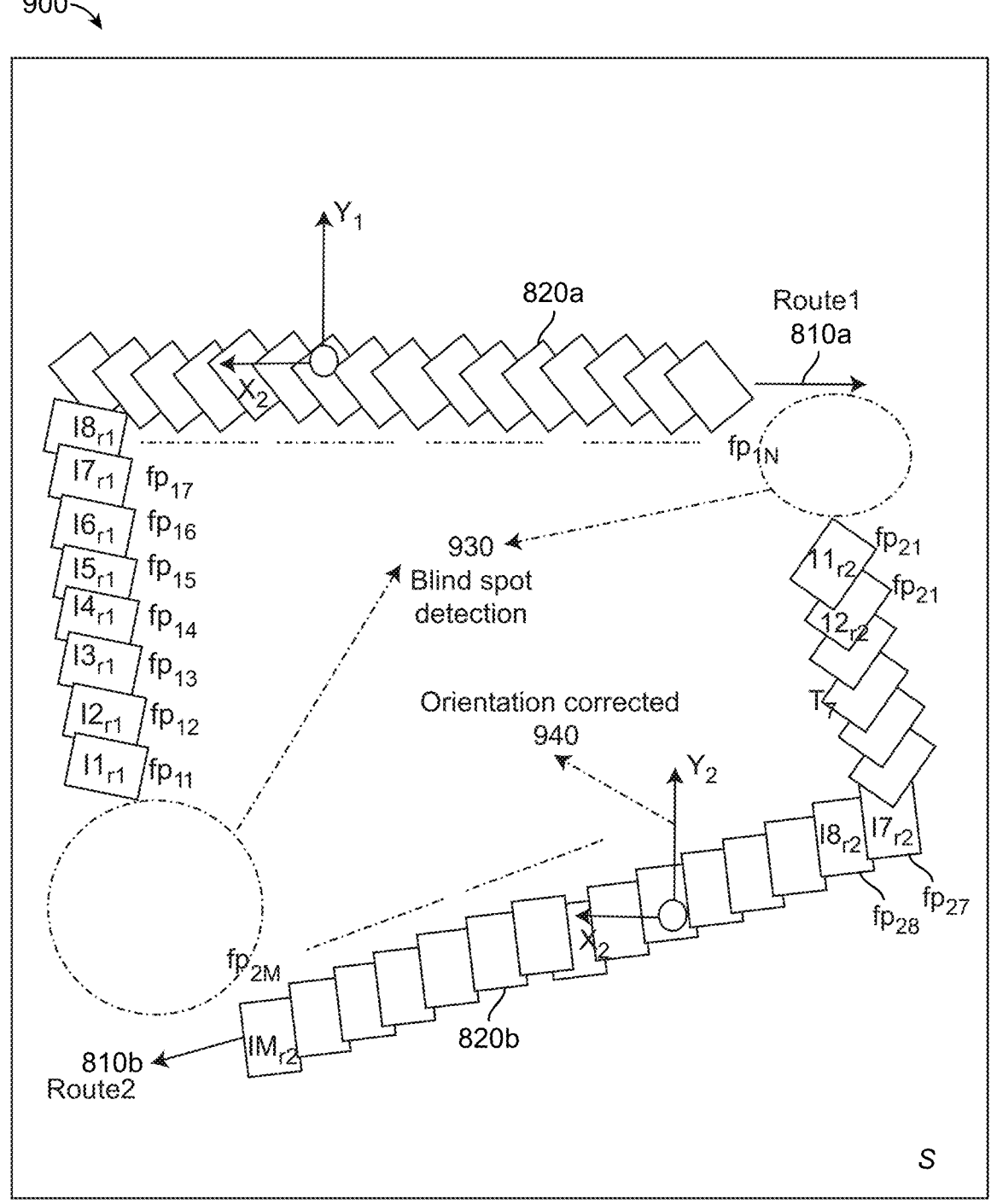
FIG. 9 is a diagram illustrating an example of the positioning of the routes of FIG. 8 relative to one other, in accordance with some aspects of the present disclosure.

FIG. 9 is a diagram illustrating an example 900 of the positioning of the routes (e.g., Route 1 810*a* and Route 2 810*b*) of FIG. 8 relative to one other. In FIG. 9, the second coordinate system $(X_2, Y_2)$ of Route 2 810*b* has been adjusted (e.g., the orientation of the second coordinate system has been corrected 940) such that the second coordinate system $(X_2, Y_2)$ is aligned (e.g., the orientation of the second coordinate system has been corrected 940) with the first coordinate system $(X_1, Y_1)$. After the coordinate systems of the routes have been aligned (as shown in FIG. 9), the one or more processors may perform blind spot detection 930. In one or more examples, a smaller survey (e.g., similar to the solution of FIGS. 6 and 7) of blind spots with an intersection within a section of the routes before the blind spots may be performed to close the loop (e.g., close the non-overlapping section).

Figure 10:
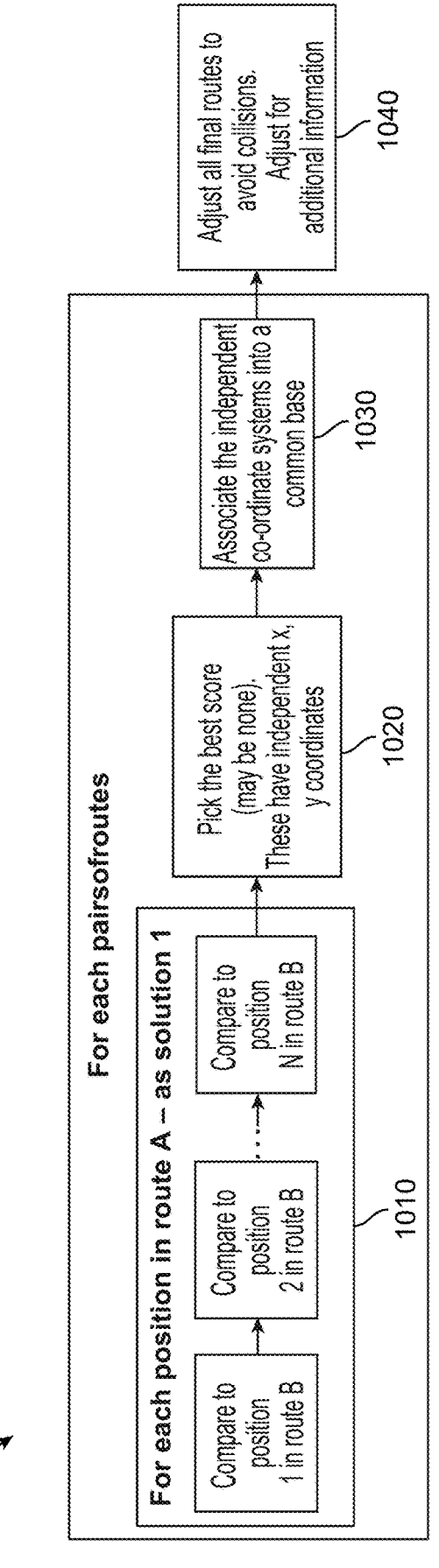
FIG. 10 is a flow chart illustrating an example of a process for the relative route positioning as shown in FIGS. 8 and 9, in accordance with some aspects of the present disclosure.

FIG. 10 is a flow chart illustrating an example of a process 1000 for the relative route positioning as shown in FIGS. 8 and 9. In FIG. 10, during operation of the process 1000, at block 1010, for each pair of routes (e.g., Route 1 810*a* and Route 2 810*b*), for each position in Route 1 810*a*: one or more processors can compare the non-visual data (e.g., fingerprint) to the non-visual data in position 1 in Route 2 810*b*, compare to the non-visual data in position 2 in Route 2 810*b*, . . . compare to the non-visual data in position N in Route 2 810*b*.

After the comparisons of the non-visual data in the two routes have been performed, at block 1020, the one or more processors can choose the non-visual data (e.g., fingerprints) from Route 1 810*a* and Route 2 810*b* that have the most similarities with each other (e.g., choose the fingerprints that have the best score). In one or more examples, there may be no best score. The routes each have independent X and Y coordinates (e.g., because the routes are generated independently, the origins and orientations of the different routes can be different). At block 1030, the one or more processors can associate the independent coordinate systems into a common base (e.g., by determining an angle difference). At block 1040, the one or more processors can then adjust all the final routes to avoid collisions and for additional information.

Figure 11:
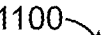
FIG. 11 is a diagram illustrating an example of employing a composite system of springs for non-overlapping routes, in accordance with some aspects of the present disclosure.

In one or more aspects, the systems and techniques provide another solution for relative route positioning by fingerprint matching in non-overlapping routes using hysteresis of sensor measurements and range measurements. FIG. 11 shows an example of this other solution. In one or more examples, this solution may be performed as post-processing to SFM.

In particular, FIG. 11 is a diagram illustrating an example 1100 of employing a composite system of springs for non-overlapping routes. In FIG. 11, two routes (e.g., Route 1 1110*a* and Route 2 1110*b*) within a space S are shown. Space S may be a space (e.g., a retail store) that needs to be surveyed. In FIG. 11, the two routes (e.g., Route 1 1110*a* and Route 2 1110*b*) are shown to not be overlapping. Each route (e.g., Route 1 1110*a* and Route 2 1110*b*) in FIG. 11 is shown to have an associated coordinate system. For example, Route 1 1110*a* has a coordinate system of $X_1, Y_1$. Route 2 810*b* has a coordinate system $X_2, Y_2$. As shown in FIG. 11, the coordinate systems of the routes are aligned with one another.

A survey device (e.g., survey device 130 of FIG. 1) may survey a scene within space S by performing data collection (e.g., collecting video and non-visual data) along the two routes (e.g., Route 1 1110*a* and Route 2 1110*b*). The survey device may first collect data (e.g., video and non-visual data) at a certain sample rate, while traversing Route 1 1110*a* during a first time period. The survey device can then proceed to collect data (e.g., video and non-visual data) at the certain sample rate, while traversing Route 2 1110*b* during a subsequent second time period. In one or more examples, one or more survey devices may be employed to collect the data for Route 1 1110*a* and Route 2 1110*b*. For example, a first survey device may collect the data for Route 1 1110*a* and a second survey device may collect the data for Route 2 1110*b*.

The video collected during the survey by the survey device includes a plurality of image frames. For example, the video (e.g., first video) collected by the survey device while traversing Route 1 1110*a* can include a plurality of image frames 1120*a* (e.g., first image frames), which are labeled in FIG. 11 from $I1_{r1}$ to $IN_{r1}$. The video (e.g., second video) collected by the survey device while traversing Route 2 1110*b* can include a plurality of image frames 1120*b* (e.g., second image frames), which are labeled in FIG. 11 from $I1_{r2}$ to $IM_{r2}$.

During the collection of video by the survey device, the survey device can also simultaneously collect non-visual data. The non-visual data (e.g., first non-visual data) collected by the survey device while traversing Route 1 1110*a* can include a plurality of non-visual data (e.g., a plurality of first non-visual data), which is labeled in FIG. 11 from $fp_{11}$ to $fp_{1N}$. The non-visual data (e.g., second non-visual data) collected by the survey device while traversing Route 2 1110*b* can include a plurality of non-visual data (e.g., a plurality of second non-visual data), which is labeled in FIG. 11 from $fp_{21}$ to $fp_{2M}$.

As shown in FIG. 11, the non-visual data collected close in time with an image frame(s) may be associated with a particular image frame(s). For example, the non-visual data $fp_{11}$ is collected (e.g., obtained) close in time with image frame 1120*a* $I1_{r1}$ and, as such, the non-visual data $fp_{11}$ may be associated with the image frame 1120*a* $I1_{r1}$. The non-visual data (e.g., fingerprints) may include sensor data, such as RF (e.g., BLE and/or Wi-Fi) measurements (e.g., RSSI data), IMU data, and/or magnetometer data. In one or more examples, the first non-visual data and the second non-visual data may include respective addresses for each wireless communication device (e.g., wireless communication device 110 of FIG. 1 in the form of an ESL) of a plurality of wireless communication devices located within the scene, and can include respective fingerprints associated with each of the addresses. In one or more examples, each address of the addresses can be a respective ID number (e.g., a MAC address) for each wireless communication device of the plurality of wireless communication devices. Each fingerprint can be based on sensor data. The sensor data may be RSSI data, magnetometer data, IMU data, acoustic data, light data, any combination thereof, and/or other type of sensor data.

One or more processors (e.g., which may be implemented within the survey device itself and/or located remote from the survey device) can identify BLE beacons (e.g., a BLE beacon 170, which can be radiated by a wireless communication device 110 of FIG. 1) heard in both Route 1 1110*a* and Route 2 1110*b*. The one or more processors can then compare the plurality of first non-visual data (e.g., RSSI data from the common beacons) of Route 1 1110*a* with the plurality of second non-visual data (e.g., RSSI data from the common beacons) of Route 2 1110*b* to determine the maximum RSSIs heard from the common beacons in each route.

The one or more processors can then associate a spring constant (k) with each RSSI observation with k=f(RSSI). As such strong RSSIs result in large spring constants, and weak RSSIs result in small spring constants. As such, the one or more processors can determine (e.g., associate) a spring constant (k) between a first image frame of the plurality of first image frames associated with the first non-visual sensor data (e.g., RSSI data) associated with the wireless communication device and a second image frame of the plurality of second image frames associated with the second non-visual sensor data (e.g., RSSI data) associated with the wireless communication device, based on a first amplitude of the first non-visual sensor data (e.g., amplitude of the RSSI data) associated with the wireless communication device and a second amplitude of the second non-visual sensor data (e.g., amplitude of the RSSI data) associated with the wireless communication device. As shown in FIG. 11, spring constants 1130*a*, 1130*b*, 1130*c* are associated with the two routes.

For each BLE beacon, the one or more processors can determine ordered pairs of the strongest spring constants in both routes. As shown in FIG. 11, pairs of spring constants 1130*a*, 1130*b*, 1130*c* are associated with the two routes. The one or more processors can determine a composite spring constant from each pair of shared observations by combining them in reciprocal (e.g., in the manner of parallel resistors). The one or more processors can select the top N number of strongest springs between the two routes, and additionally, where possible, including springs that are spread out along the length of each route. The one or more processors may perform this selection by discarding observations that are too close to each other on each route.

The one or more processors may add some additional very strong springs to constrain one of the tracks to be in a fixed location and orientation (e.g., to prevent the problem from being ill-conditioned). The one or more processors may treat the individual routes as being rigid by associating an offset and orientation with each route, or may treat the individual routes as being deformable by allowing some degree of local flexibility within the routes.

The one or more processors may solve the route locations as a composite system of springs attached to the locations of the original routes by using standard linear algebra methods. In one or more examples, the solution may be obtained directly using singular value decomposition (SVD), without the need for minimization. The areas of overlap within the solved routes' locations can indicate where in each route to search for commonality of image features within other routes. The same solution method can be also applied to fingerprints by similarly associating fingerprint similarity with a spring constant.

The one or more processors can adjust a first form of a first model (e.g., as shown in FIG. 11) of Route 1 1110*a* and a second form of a second model (e.g., as shown in FIG. 11) of Route 2 1110*b* with respect to each other based on the spring constant (k). For example, the one or more processors can adjust (e.g., transform, shift, and/or move) the routes closer together based on the pairs of spring constants 1130*a*, 1130*b*, 1130*c* that are associated with the two routes.

FIG. 12 is a flow chart illustrating an example of a process 1200 for SFM sequencing using non-visual information. The process 1200 can be performed by a device (e.g., survey device 130 of FIG. 1) or by a component or system (e.g., a chipset) of the device. The operations of the process 1200 may be implemented as software components that are executed and run on one or more processors (e.g., processor 1310 of FIG. 13 or other processor(s)). Further, the transmission and reception of signals by the device in the process 1200 may be enabled, for example, by one or more antennas and/or one or more transceivers (e.g., wireless transceiver (s)).

At block 1202, the device (or component thereof) can obtain a first video of a scene and a plurality of first non-visual data along a first route. The first video includes a plurality of first image frames. Each first non-visual data of the plurality of first non-visual data is associated with one or more respective first image frames of the plurality of first image frames. At block 1204, the device (or component thereof) can obtain a second video of the scene and a plurality of second non-visual data along a second route. The second video includes a plurality of second image frames. Each second non-visual data of the plurality of second non-visual data is associated with one or more respective second image frames of the plurality of second image frames. In some aspects, each first non-visual data and each second non-visual data includes a respective address for each wireless communication device of a plurality of wireless communication devices within the scene and a respective fingerprint associated with each respective address. In some cases, each respective address is a respective identification (ID) number for each wireless communication device of the plurality of wireless communication devices. In some examples, each wireless communication device of the plurality of wireless communication devices is an electronic shelf label (ESL) or other type of peripheral device. In some cases, each respective fingerprint is based on sensor data, such as received signal strength indicator (RSSI) data, magnetometer data, inertial measurement unit (IMU) data, acoustic data, light data, any combination thereof, and/or other type of sensor data.

In some aspects, the first video and the plurality of first non-visual data is captured by a first device traversing the first route and the second video and the plurality of second non-visual data is captured by a second device traversing the second route. In some cases, the first device and the second device can be a same device (where a single device captures the first video, the plurality of first non-visual data, the second video, and the plurality of second non-visual data). The device can be a camera and a reader. In some cases, the first device and the second device are different devices. In such cases, the first device can include a first camera and a first reader and the second device can include a second camera and a second reader.

In some cases, the device (or component thereof) can compare the plurality of first non-visual data of the first route with the plurality of second non-visual data of the second route. At block 1206, the device (or component thereof) can determine one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames (e.g., based on comparing the plurality of first non-visual data with the plurality of second non-visual data).

At block 1208, the device (or component thereof) can determine pairs of image frames from the one or more first image frames and the one or more second image frames that are determined to be similar based on image data of the scene in the one or more first image frames and the one or more second image frames. In some aspects, each pair of the pairs of image frames comprises a first image frame of the one or more first image frames and a second image frame of the one or more second image frames. In some cases, to determine the pairs of image frames from the one or more first image frames and the one or more second image frames that are determined to be similar, the device (or component thereof) can determine similarities in the image data of the scene in the one or more first image frames and the one or more second image frames.

At block 1210, the device (or component thereof) can process the pairs of image frames to reconstruct the scene in three dimensions (3D) comprising a reconstruction of an overlap of the first route and the second route. In some aspects, the device (or component thereof) can process the pairs of image frames using structure from motion (SFM) image processing.

In some cases, the computing device may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1200 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
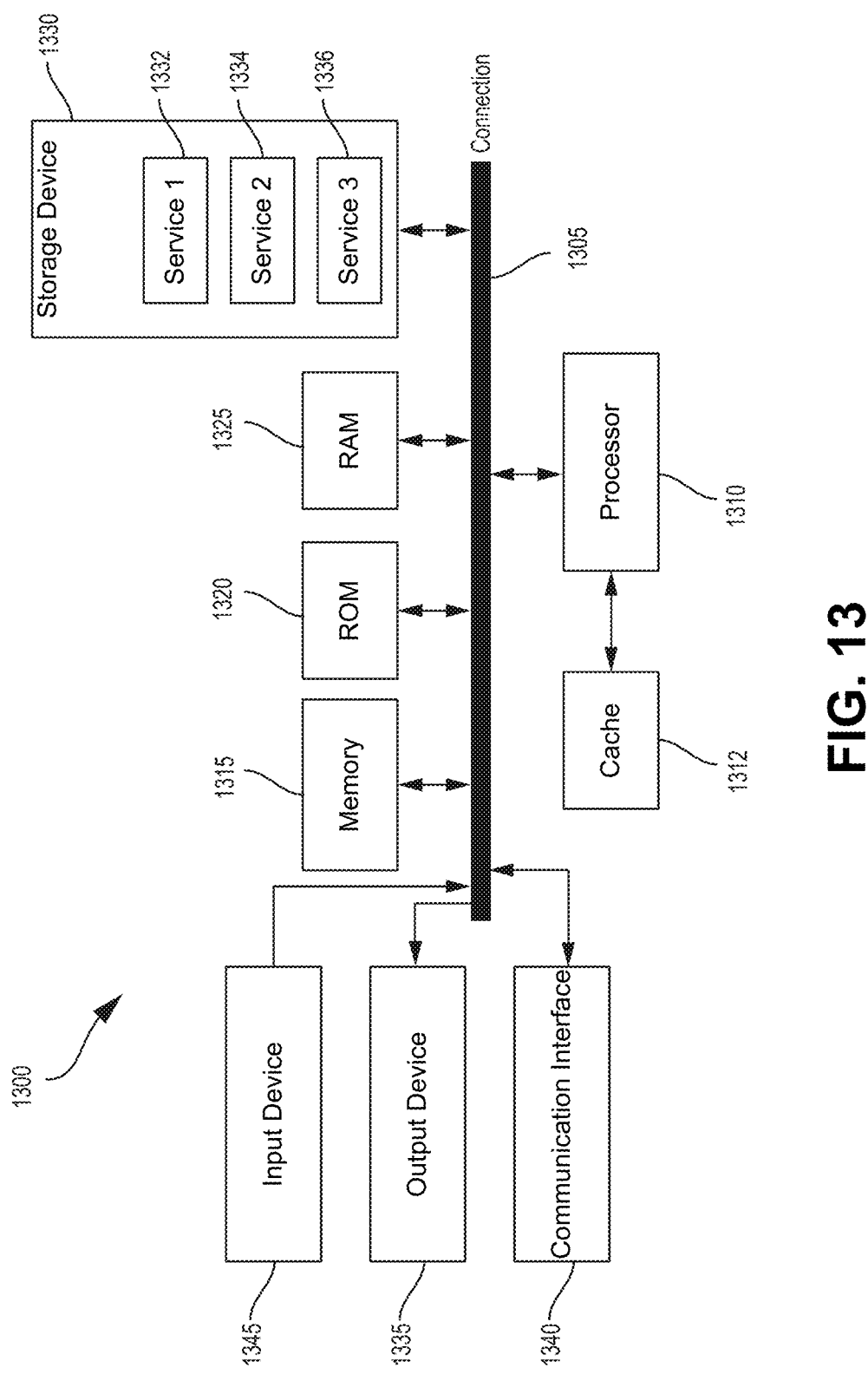
FIG. 13 is a block diagram illustrating an example computing system, in accordance with some aspects of the present disclosure.

FIG. 13 is a block diagram illustrating an example of a computing system 1300, which may be employed for SFM sequencing using non-visual information. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image processing, the apparatus comprising: at least one memory; and at least one processor coupled to the at least one memory and configured to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; determine one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames; determine pairs of image frames from the one or more first image frames and the one or more second image frames that are determined to be similar based on image data of the scene in the one or more first image frames and the one or more second image frames; and process the pairs of image frames to reconstruct the scene in three dimensions (3D) comprising a reconstruction of an overlap of the first route and the second route.

Aspect 2. The apparatus of Aspect 1, wherein each first non-visual data and each second non-visual data comprise a respective address for each wireless communication device of a plurality of wireless communication devices within the scene and a respective fingerprint associated with each respective address.

Aspect 3. The apparatus of Aspect 2, wherein each respective address is a respective identification (ID) number for each wireless communication device of the plurality of wireless communication devices.

Aspect 4. The apparatus of any one of Aspects 2 or 3, wherein each wireless communication device of the plurality of wireless communication devices is an electronic shelf label (ESL).

Aspect 5. The apparatus of any one of Aspects 2 to 4, wherein each respective fingerprint is based on sensor data.

Aspect 6. The apparatus of Aspect 5, wherein the sensor data is at least one of received signal strength indicator (RSSI) data, magnetometer data, inertial measurement unit (IMU) data, acoustic data, or light data.

Aspect 7. The apparatus of any one of Aspects 1 to 6, wherein the first video and the plurality of first non-visual data is captured by a first device traversing the first route, and wherein the second video and the plurality of second non-visual data is captured by a second device traversing the second route.

Aspect 8. The apparatus of Aspect 7, wherein the first device and the second device are a same device that includes a camera and a reader.

Aspect 9. The apparatus of any one of Aspects 7 or 8, wherein the first device and the second device are different devices, wherein the first device comprises a first camera and a first reader, and wherein the second device comprises a second camera and a second reader.

Aspect 10. The apparatus of any one of Aspects 1 to 9, wherein the at least one processor is configured to process the pairs of image frames using structure from motion (SFM) image processing.

Aspect 11. The apparatus of any one of Aspects 1 to 10, wherein each pair of the pairs of image frames comprises a first image frame of the one or more first image frames and a second image frame of the one or more second image frames.

Aspect 12. The apparatus of any one of Aspects 1 to 11, wherein, to determine the pairs of image frames from the one or more first image frames and the one or more second image frames that are determined to be similar, the at least one processor is configured to determine similarities in the image data of the scene in the one or more first image frames and the one or more second image frames.

Aspect 13. A method for image processing, the method comprising: obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtaining a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; determining one or more first image frames of the plurality of first image frames that are similar to one or more second image frames of the plurality of second image frames based on determining first non-visual data of the plurality of first non-visual data associated with the one or more first image frames is similar to second non-visual data of the plurality of second non-visual data associated with the one or more second image frames; determining pairs of image frames from the one or more first image frames and the one or more second image frames that are determined to be similar based on image data of the scene in the one or more first image frames and the one or more second image frames; and processing the pairs of image frames to reconstruct the scene in three dimensions (3D) comprising a reconstruction of an overlap of the first route and the second route.

Aspect 14. The method of Aspect 13, wherein each first non-visual data and each second non-visual data comprise a respective address for each wireless communication device of a plurality of wireless communication devices within the scene and a respective fingerprint associated with each respective address.

Aspect 15. The method of Aspect 14, wherein each respective address is a respective identification (ID) number for each wireless communication device of the plurality of wireless communication devices.

Aspect 16. The method of any one of Aspects 14 or 15, wherein each wireless communication device of the plurality of wireless communication devices is an electronic shelf label (ESL).

Aspect 17. The method of any one of Aspects 14 to 16, wherein each respective fingerprint is based on sensor data.

Aspect 18. The method of Aspect 17, wherein the sensor data is at least one of received signal strength indicator (RSSI) data, magnetometer data, inertial measurement unit (IMU) data, acoustic data, or light data.

Aspect 19. The method of any one of Aspects 13 to 18, wherein the first video and the plurality of first non-visual data is captured by a first device traversing the first route, and wherein the second video and the plurality of second non-visual data is captured by a second device traversing the second route.

Aspect 20. The method of Aspect 19, wherein the first device and the second device are a same device that includes a camera and a reader.

Aspect 21. The method of any one of Aspects 19 or 20, wherein the first device and the second device are different devices, wherein the first device comprises a first camera and a first reader, and wherein the second device comprises a second camera and a second reader.

Aspect 22. The method of any one of Aspects 13 to 21, wherein the pairs of image frames are processed using structure from motion (SFM) image processing.

Aspect 23. The method of any one of Aspects 13 to 22, wherein each pair of the pairs of image frames comprises a first image frame of the one or more first image frames and a second image frame of the one or more second image frames.

Aspect 24. The method of any one of Aspects 13 to 23, wherein determining the pairs of image frames from the one or more first image frames and the one or more second image frames comprises determining similarities in the image data of the scene in the one or more first image frames and the one or more second image frames.

Aspect 25. A non-transitory computer-readable medium having stored thereon instructions that, when executed by one or more processors, cause the one or more processors to perform operations according to any of Aspects 13 to 24.

Aspect 26. An apparatus including one or more means for performing operations according to any of Aspects 13 to 24.

Aspect 27. An apparatus for image processing, the apparatus comprising: at least one memory; and at least one processor coupled to the at least one memory and configured to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; compare the plurality of first non-visual data of the first route with the plurality of second non-visual data of the second route; determine an angle difference between a first coordinate system of a first model of the first route with a second coordinate system of a second model of the second route based on comparing the plurality of first non-visual data of the first route with the plurality of second non-visual data of the second route; and adjust one of the first coordinate system or the second coordinate system based on the angle difference such that the first coordinate system is aligned with the second coordinate system.

Aspect 28. A method for image processing, the method comprising: obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtaining a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; comparing the plurality of first non-visual data of the first route with the plurality of second non-visual data of the second route; determining an angle difference between a first coordinate system of a first model of the first route with a second coordinate system of a second model of the second route based on comparing the plurality of first non-visual data of the first route with the plurality of second non-visual data of the second route; and adjusting one of the first coordinate system or the second coordinate system based on the angle difference such that the first coordinate system is aligned with the second coordinate system.

Aspect 29. A non-transitory computer-readable medium having stored thereon instructions that, when executed by one or more processors, cause the one or more processors to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; compare the plurality of first non-visual data of the first route with the plurality of second non-visual data of the second route; determine an angle difference between a first coordinate system of a first model of the first route with a second coordinate system of a second model of the second route based on comparing the plurality of first non-visual data of the first route with the plurality of second non-visual data of the second route; and adjust one of the first coordinate system or the second coordinate system based on the angle difference such that the first coordinate system is aligned with the second coordinate system.

Aspect 30. An apparatus including: means for obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; means for obtaining a second video of the scene and a plurality of second non-visual data along a second route, wherein the second video comprises a plurality of second image frames, and wherein each second non-visual data of the plurality of second non-visual data is associated with one or more respective second image frames of the plurality of second image frames; means for comparing the plurality of first non-visual data of the first route with the plurality of second non-visual data of the second route; means for determining an angle difference between a first coordinate system of a first model of the first route with a second coordinate system of a second model of the second route based on comparing the plurality of first non-visual data of the first route with the plurality of second non-visual data of the second route; and means for adjusting one of the first coordinate system or the second coordinate system based on the angle difference such that the first coordinate system is aligned with the second coordinate system.

Aspect 31. An apparatus for image processing, the apparatus comprising: at least one memory; and at least one processor coupled to the at least one memory and configured to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along traversing a second route, wherein the second video comprises a plurality of second image frames, and wherein each second non-visual data of the plurality of second non-visual data is associated with one or more respective second image frames of the plurality of second image frames; compare first non-visual data associated with a wireless communication device of the plurality of first non-visual data of the first route with second non-visual data associated with the wireless communication device of the plurality of second non-visual data of the second route; determine a spring constant between a first image frame of the plurality of first image frames associated with the first non-visual data associated with the wireless communication device and a second image frame of the plurality of second image frames associated with the second non-visual data associated with the wireless communication device based on a first amplitude of the first non-visual data associated with the wireless communication device and a second amplitude of the second non-visual data associated with the wireless communication device; and adjust a first form of a first model of the first route and a second form of a second model of the second route with respect to each other based on the spring constant.

Aspect 32. A method for image processing, the method comprising: obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtaining a second video of the scene and a plurality of second non-visual data along traversing a second route, wherein the second video comprises a plurality of second image frames, and wherein each second non-visual data of the plurality of second non-visual data is associated with one or more respective second image frames of the plurality of second image frames; comparing first non-visual data associated with a wireless communication device of the plurality of first non-visual data of the first route with second non-visual data associated with the wireless communication device of the plurality of second non-visual data of the second route; determining a spring constant between a first image frame of the plurality of first image frames associated with the first non-visual data associated with the wireless communication device and a second image frame of the plurality of second image frames associated with the second non-visual data associated with the wireless communication device based on a first amplitude of the first non-visual data associated with the wireless communication device and a second amplitude of the second non-visual data associated with the wireless communication device; and adjusting a first form of a first model of the first route and a second form of a second model of the second route with respect to each other based on the spring constant.

Aspect 33. A non-transitory computer-readable medium having stored thereon instructions that, when executed by one or more processors, cause the one or more processors to: obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; obtain a second video of the scene and a plurality of second non-visual data along traversing a second route, wherein the second video comprises a plurality of second image frames, and wherein each second non-visual data of the plurality of second non-visual data is associated with one or more respective second image frames of the plurality of second image frames; compare first non-visual data associated with a wireless communication device of the plurality of first non-visual data of the first route with second non-visual data associated with the wireless communication device of the plurality of second non-visual data of the second route; determine a spring constant between a first image frame of the plurality of first image frames associated with the first non-visual data associated with the wireless communication device and a second image frame of the plurality of second image frames associated with the second non-visual data associated with the wireless communication device based on a first amplitude of the first non-visual data associated with the wireless communication device and a second amplitude of the second non-visual data associated with the wireless communication device; and adjust a first form of a first model of the first route and a second form of a second model of the second route with respect to each other based on the spring constant.

Aspect 34. An apparatus including: means for obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames; means for obtaining a second video of the scene and a plurality of second non-visual data along traversing a second route, wherein the second video comprises a plurality of second image frames, and wherein each second non-visual data of the plurality of second non-visual data is associated with one or more respective second image frames of the plurality of second image frames; means for comparing first non-visual data associated with a wireless communication device of the plurality of first non-visual data of the first route with second non-visual data associated with the wireless communication device of the plurality of second non-visual data of the second route; means for determining a spring constant between a first image frame of the plurality of first image frames associated with the first non-visual data associated with the wireless communication device and a second image frame of the plurality of second image frames associated with the second non-visual data associated with the wireless communication device based on a first amplitude of the first non-visual data associated with the wireless communication device and a second amplitude of the second non-visual data associated with the wireless communication device; and means for adjusting a first form of a first model of the first route and a second form of a second model of the second route with respect to each other based on the spring constant.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:
   at least one memory; and
   at least one processor coupled to the at least one memory and configured to:
      obtain a first video of a scene and a plurality of first non-visual data along a first route, wherein the first video comprises a plurality of first image frames, and wherein each first non-visual data of the plurality of first non-visual data is associated with one or more respective first image frames of the plurality of first image frames;
      obtain a second video of the scene and a plurality of second non-visual data along a second route, wherein the second video comprises a plurality of second image frames, and wherein each second non-visual data of the plurality of second non-visual data is associated with one or more respective second image frames of the plurality of second image frames;
      determine that one or more first image frames of the plurality of first image frames are similar to one or more second image frames of the plurality of second image frames and that the one or more first image frames and the one or more second image frames are located within an overlapping fingerprint section where the first route and the second route overlap, based on determining first non-visual data of the plurality of first non-visual data associated with the one or more first image frames is similar to second non-visual data of the plurality of second non-visual data associated with the one or more second image frames;
      determine pairs of image frames from the one or more first image frames and the one or more second image frames that are determined to be similar based on image data of the scene in the one or more first image frames and the one or more second image frames; and
      process the pairs of image frames to reconstruct the scene in three dimensions (3D) comprising a reconstruction of an overlap of the first route and the second route.

2. The apparatus of claim 1, wherein each first non-visual data and each second non-visual data comprise a respective address for each wireless communication device of a plurality of wireless communication devices within the scene and a respective fingerprint associated with each respective address.

3. The apparatus of claim 2, wherein each respective address is a respective identification (ID) number for each wireless communication device of the plurality of wireless communication devices.

4. The apparatus of claim 2, wherein each wireless communication device of the plurality of wireless communication devices is an electronic shelf label (ESL).

5. The apparatus of claim 2, wherein each respective fingerprint is based on sensor data.

6. The apparatus of claim 5, wherein the sensor data is at least one of received signal strength indicator (RSSI) data, magnetometer data, inertial measurement unit (IMU) data, acoustic data, or light data.

7. The apparatus of claim 1, wherein the first video and the plurality of first non-visual data are captured by a first device traversing the first route, and wherein the second video and the plurality of second non-visual data are captured by a second device traversing the second route.

8. The apparatus of claim 7, wherein the first device and the second device are a same device that includes a camera and a reader.

9. The apparatus of claim 7, wherein the first device and the second device are different devices, wherein the first device comprises a first camera and a first reader, and wherein the second device comprises a second camera and a second reader.

10. The apparatus of claim 1, wherein the at least one processor is configured to process the pairs of image frames using structure from motion (SFM) image processing.

11. The apparatus of claim 1, wherein each pair of the pairs of image frames comprises a first image frame of the one or more first image frames and a second image frame of the one or more second image frames.

12. The apparatus of claim 1, wherein, to determine the pairs of image frames from the one or more first image frames and the one or more second image frames that are determined to be similar, the at least one processor is configured to determine similarities in the image data of the scene in the one or more first image frames and the one or more second image frames.

13. A method for image processing, the method comprising:

obtaining a first video of a scene and a plurality of first non-visual data along a first route, wherein the first video comprises a plurality of first image frames, and wherein each first non-visual data of the plurality of first non-visual data is associated with one or more respective first image frames of the plurality of first image frames;

obtaining a second video of the scene and a plurality of second non-visual data along a second route, wherein the second video comprises a plurality of second image frames, and wherein each second non-visual data of the plurality of second non-visual data is associated with one or more respective second image frames of the plurality of second image frames;

determining that one or more first image frames of the plurality of first image frames are similar to one or more second image frames of the plurality of second image frames and that the one or more first image frames and the one or more second image frames are located within an overlapping fingerprint section where the first route and the second route overlap, based on determining first non-visual data of the plurality of first non-visual data associated with the one or more first image frames is similar to second non-visual data of the plurality of second non-visual data associated with the one or more second image frames;

determining pairs of image frames from the one or more first image frames and the one or more second image frames that are determined to be similar based on image data of the scene in the one or more first image frames and the one or more second image frames; and processing the pairs of image frames to reconstruct the scene in three dimensions (3D) comprising a reconstruction of an overlap of the first route and the second route.

14. The method of claim 13, wherein each first non-visual data and each second non-visual data comprise a respective address for each wireless communication device of a plurality of wireless communication devices within the scene and a respective fingerprint associated with each respective address.

15. The method of claim 14, wherein each respective address is a respective identification (ID) number for each wireless communication device of the plurality of wireless communication devices.

16. The method of claim 14, wherein each respective fingerprint is based on sensor data, and wherein the sensor data is at least one of received signal strength indicator (RSSI) data, magnetometer data, inertial measurement unit (IMU) data, acoustic data, or light data.

17. The method of claim 13, wherein the first video and the plurality of first non-visual data is captured by a first device traversing the first route, and wherein the second video and the plurality of second non-visual data is captured by a second device traversing the second route.

18. The method of claim 17, wherein the first device and the second device are a same device that includes a camera and a reader.

19. The method of claim 17, wherein the first device and the second device are different devices, wherein the first device comprises a first camera and a first reader, and wherein the second device comprises a second camera and a second reader.

20. The method of claim 13, wherein determining the pairs of image frames from the one or more first image frames and the one or more second image frames that are determined to be similar comprises determining similarities in the image data of the scene in the one or more first image frames and the one or more second image frames.

* * * * *